Oct. 9, 1956
W. R. FISHER
2,766,083
BUSHING
Filed March 27, 1953
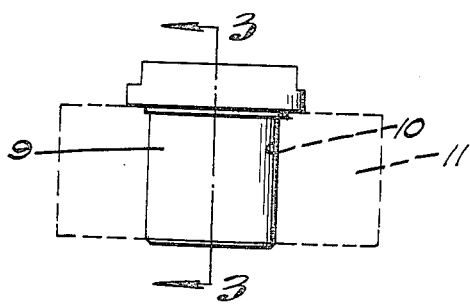
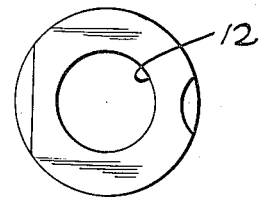
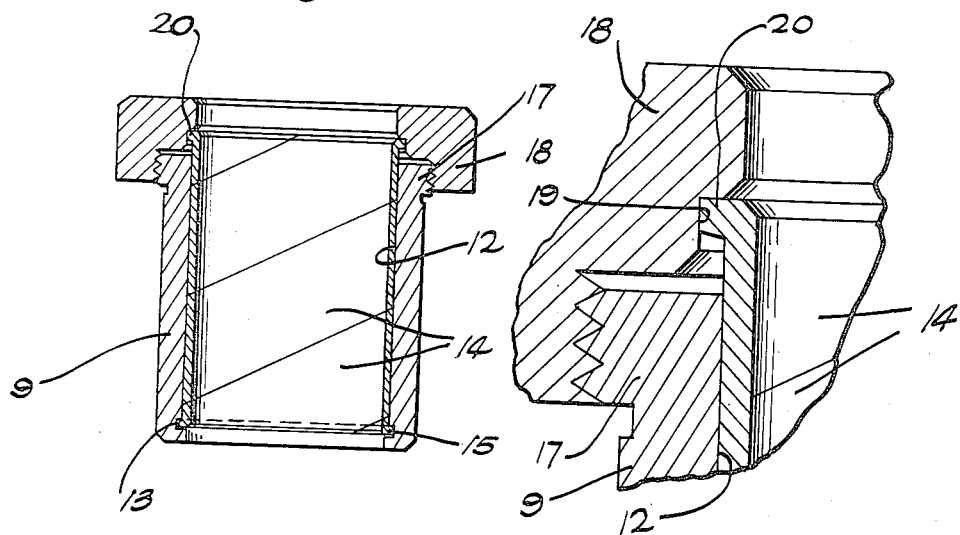
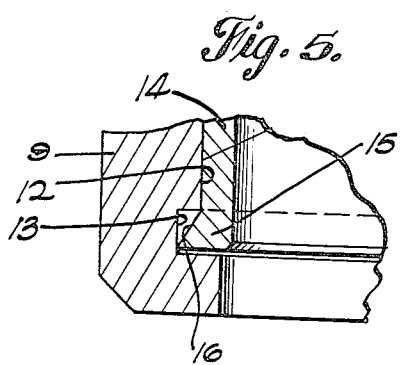
INVENTOR.
W. REUEN FISHER
BY
Thos. S. Donnelly
ATTORNEY.

United States Patent Office 2,766,083
Patented Oct. 9, 1956

2,766,083
BUSHING
W Reuen Fisher, North Branch, Mich.
Application March 27, 1953, Serial No. 345,149
3 Claims. (Cl. 308—237)

My invention relates to a new and useful improvement in a bushing. This bushing may be used as a guide bushing for guiding drills, taps and so forth toward a work piece or as a bearing for a rotating body.

It is an object of the present invention to provide a bushing of this class formed from coiled, hardened, wear-resisting, resilient metal so that the coil forms a closing cylindrical body with a flange projecting radially outwardly from one end and engageable in a groove or recess in a retaining body so that longitudinal movement of the same cannot be effected.

Another object of the invention is the provision of a bushing formed from a coiled strip of hardened, wear-resisting metal and insertable into the bore of a retainer under torque and provided at one end with a peripheral radial flange engageable in a retaining recess or groove in the retainer.

Other objects will appear hereinafter.

It is recognized that various modifications and changes may be made in the details of structure illustrated without departing from the invention and it is intended that the present disclosure shall be considered but the preferred embodiment of the invention.

Forming a part of this application are drawings in which,

Fig. 1 is an elevational view of the invention.
Fig. 2 is a top plan view of the invention.
Fig. 3 is an enlarged sectional view taken on line 3—3 of Fig. 1.
Fig. 4 is a fragmentary enlarged view of one end of the invention.
Fig. 5 is a fragmentary enlarged view of the other end of the invention.

As shown in the drawings, I provided a retainer 9 which may be mounted in an opening 10 formed in a jig plate or other suitable support 11. This retainer is provided with a bore 12 of a determined diameter. Opening into the bore, at one end of the retainer 9, is a groove 13. The bushing or liner inserted in the bore 12 is formed from a strip of flat, hardened, wear-resisting metal coiled to provide the coils 14. At one end of the coil is provided a peripheral flange 15.

The coil is normally of a larger outside diameter than the diameter of the bore 12. When inserting the coil into this bore, the coil is torqued to a smaller diameter and while under this torquing strain the coil may be inserted in the bore 12. When the torquing force on the coil is released, the coil will tend to spring out to its normal outside diameter and thus frictionally bear against the surface of the bore 12. By using a bore 12 of a predetermined diameter and a metal strip of proper thickness from which the coil is formed, the diameter of the bore will therefore determine the inside diameter of the coil. When, upon inserting the coil into the bore 12, the flange 15 registers with the groove 13, this flange will, of course, snap into the annular groove or channel 13 and serve to prevent longitudinal movement of the coil relative to the retainer. It will be noted that the annular groove or channel 13 is of slightly larger width than the thickness of the flange 15. This flange 15 is also provided with a tapered periphery 16, thus facilitating removal of the coil from the retainer 9. In order to remove the coil from the retainer it is then necessary to torque the coil to smaller dimensions and exert an axial pull on the coil which will force the flange 15 inwardly out of the groove 13.

It is believed obvious that this flange need not extend the full circumference of the coil but that it may consist of spaced-apart peripheral projections which will engage in a groove or a pocket or recess formed in the inner surface of the retainer 9.

The retainer 9 is provided with the externally-threaded terminal portion 17 on which threads a collar 18. This collar 18 is provided, inwardly from its threaded end, with an annular groove or channel 19 corresponding to the groove 13. As the collar 18 is threaded into position it will ride over the peripheral flange 20 until this flange registers with the groove 19 whereupon the flange will snap into the channel 19. The collar with its channel 19 therefore cooperates with the channel 13 in the retainer to resist axial movement of the coil in the retainer. The lower surface of the flange 20 is slightly tapered so that upon unthreading the collar this flange 20 may be forced to spring inwardly so as to disengage from the channel 19.

With the bushing constructed in this manner, the retainer may be made from soft, inexpensive material and easily and quickly provided with a liner of hardened, wear-resisting material which may be easily and quickly removed and replaced.

What I claim is:

1. A bushing comprising a single piece retainer having a bore of uniform diameter formed therethrough and provided at one end with an annular channel in the surface of the bore; a liner for said retainer comprising a coil of spirally wound, flat, resilient, wear-resisting metal normally of larger outside diameter than the diameter of said bore and torqued to a smaller than normal outside diameter for insertion into said bore and frictionally engaging at its periphery the surface of said bore; an annular radially outwardly projecting flange on the periphery of said coil at one end and engaging in said annular channel; said flange being provided with a tapered periphery to facilitate removal of the coil from said retainer; and means mounted on said retainer engageable with the opposite end of said coil for assisting in preventing relative axial movement of said coil and said retainer.

2. The structure of claim 1 in which the annular channel is of greater width than the thickness of the flange engaged therein.

3. A bushing comprising a single piece retainer having a bore of uniform diameter formed therethrough and provided at one end with an annular channel in the surface thereof; a liner for said retainer comprising a coil of spirally wound, flat, resilient, wear-resisting metal normally of larger outside diameter than the diameter of said bore and torqued to a smaller than normal outside diameter and inserted in said bore and frictionally engaging at its periphery the surface of said bore, an annular radially outwardly projecting flange on the periphery of said coil at one end and engaging in said annular channel; a radially outwardly projecting flange at the periphery of said liner at its opposite end and said liner at said opposite end projecting beyond an end of said retainer; a collar threaded on said end of said retainer in embracing relation to the projecting end of said liner and having an internal annular channel for the reception of said flange on said opposite end of said retainer upon threading of said collar onto said retainer a predetermined distance, said last named flange having its inner face bevelled and engageable with the face of said channel in said threaded collar upon the threading of said collar off of said retainer for torquing said liner to smaller diameter.

References Cited in the file of this patent

UNITED STATES PATENTS

| | | |
|---|---|---|
| 479,039 | Van Benthuysen | July 19, 1892 |
| 597,797 | Burke | Jan. 25, 1898 |
| 1,454,682 | Layne | May 8, 1923 |
| 1,606,690 | Bouton | Nov. 9, 1926 |
| 1,940,345 | Brownlee | Dec. 19, 1933 |